(12) United States Patent
Nielsen et al.

(10) Patent No.: US 9,659,268 B2
(45) Date of Patent: May 23, 2017

(54) TICKET APPROVAL SYSTEM FOR AND METHOD OF PERFORMING QUALITY CONTROL IN FIELD SERVICE APPLICATIONS

(75) Inventors: Steven E. Nielsen, North Palm Beach, FL (US); Curtis Chambers, Palm Beach Gardens, FL (US); David Pennington, Juno Beach, FL (US)

(73) Assignee: CertusVies Technologies, LLC, Palm Beach Gardens, FL (US)

( * ) Notice: Subject to any disclaimer, the term of this patent is extended or adjusted under 35 U.S.C. 154(b) by 501 days.

(21) Appl. No.: 12/204,454

(22) Filed: Sep. 4, 2008

(65) Prior Publication Data

US 2009/0204466 A1    Aug. 13, 2009

Related U.S. Application Data

(63) Continuation-in-part of application No. 12/029,732, filed on Feb. 12, 2008, now Pat. No. 8,532,342.

(60) Provisional application No. 61/076,253, filed on Jun. 27, 2008.

(51) Int. Cl.
   *G06Q 10/06* (2012.01)
   *G06Q 10/10* (2012.01)
   *G06Q 50/08* (2012.01)

(52) U.S. Cl.
   CPC ....... *G06Q 10/06395* (2013.01); *G06Q 10/06* (2013.01); *G06Q 10/06398* (2013.01); *G06Q 10/063112* (2013.01); *G06Q 10/1097* (2013.01); *G06Q 50/08* (2013.01)

(58) Field of Classification Search
   CPC ............................... G06Q 10/06395

USPC ....................................................... 705/7.41
See application file for complete search history.

(56) References Cited

U.S. PATENT DOCUMENTS

| 4,208,653 A | 6/1980 | Abe |
| 4,455,509 A | 6/1984 | Crum et al. |
| 4,550,376 A | 10/1985 | Maciejczak |
| 5,103,920 A | 4/1992 | Patton |
| 5,486,067 A | 1/1996 | Huynh |
| 5,918,565 A | 7/1999 | Casas |
| 6,074,693 A | 6/2000 | Manning |
| 6,138,906 A | 10/2000 | DeMayo |

(Continued)

FOREIGN PATENT DOCUMENTS

| CA | 2386200 | 4/2000 |
| CA | 2435290 | 8/2002 |

(Continued)

OTHER PUBLICATIONS

International Search Report and Written Opinion, Application Serial No. PCT/2009/05443, Apr. 5, 2010.

(Continued)

*Primary Examiner* — Andre Boyce
(74) *Attorney, Agent, or Firm* — Cooley LLP

(57) ABSTRACT

A ticket approval system and method of performing quality control in a field service application. The method includes obtaining a ticket, performing at least one task associated with the ticket, collecting data associated with at least one task, and transmitting the data to a work management server including database and approval applications. Also provided is a method of reviewing the data received by the approval application for quality control purposes.

27 Claims, 10 Drawing Sheets

(56) References Cited

U.S. PATENT DOCUMENTS

| | | |
|---|---|---|
| 6,169,517 B1 | 1/2001 | Eslambolchi |
| 6,353,767 B1 | 3/2002 | Wakeman et al. |
| 6,421,725 B1 | 7/2002 | Vermilyea et al. |
| 6,437,708 B1 | 8/2002 | Brouwer |
| 6,512,312 B1 | 1/2003 | Herkenrath et al. |
| 6,526,443 B1 | 2/2003 | Goldsmith et al. |
| 6,526,526 B1 | 2/2003 | Dong et al. |
| 6,578,005 B1 | 6/2003 | Lesaint et al. |
| 6,601,017 B1 | 7/2003 | Kennedy et al. |
| 6,684,250 B2 | 1/2004 | Anderson |
| 6,748,340 B2 * | 6/2004 | Otsuki et al. ................ 702/150 |
| 6,751,553 B2 | 6/2004 | Young |
| 6,751,554 B1 | 6/2004 | Asher et al. |
| 6,845,148 B1 * | 1/2005 | Beamon ....................... 379/9.02 |
| 6,915,211 B2 | 7/2005 | Kram et al. |
| 6,938,048 B1 * | 8/2005 | Jilk et al. ..................... 705/7.14 |
| 6,949,052 B2 | 9/2005 | Millington et al. |
| 6,958,690 B1 | 10/2005 | Asher et al. |
| 6,980,929 B2 | 12/2005 | Aronstam et al. |
| 6,996,210 B2 | 2/2006 | Esty et al. |
| 6,999,021 B2 | 2/2006 | Taylor, Jr. |
| 7,003,443 B2 | 2/2006 | Ford et al. |
| 7,003,475 B1 | 2/2006 | Friedland et al. |
| 7,079,990 B2 | 7/2006 | Haller et al. |
| 7,313,759 B2 | 12/2007 | Sinisi |
| 7,324,905 B2 | 1/2008 | Droubie et al. |
| 7,372,247 B1 | 5/2008 | Giusti et al. |
| 7,398,184 B1 | 7/2008 | Chen |
| 7,400,976 B2 | 7/2008 | Young et al. |
| 7,469,247 B2 | 12/2008 | Cossins et al. |
| 7,532,127 B2 | 5/2009 | Holman et al. |
| 7,626,496 B1 | 12/2009 | Asher et al. |
| 7,640,105 B2 | 12/2009 | Nielsen et al. |
| 7,741,848 B1 | 6/2010 | Olsson |
| 7,773,095 B1 | 8/2010 | Badrak et al. |
| 7,889,124 B2 | 2/2011 | Islam et al. |
| 7,986,246 B2 | 7/2011 | Angelis et al. |
| 8,040,272 B1 | 10/2011 | Clodfelter et al. |
| 8,077,072 B2 | 12/2011 | Mohamadi et al. |
| 8,127,865 B2 | 3/2012 | Watson et al. |
| 8,311,765 B2 | 11/2012 | Nielsen et al. |
| 8,473,148 B2 | 6/2013 | Nielsen et al. |
| 8,480,332 B2 | 7/2013 | Miller |
| 8,532,341 B2 | 9/2013 | Nielsen et al. |
| 8,543,937 B2 | 9/2013 | Nielsen et al. |
| 8,577,707 B2 | 11/2013 | Nielsen et al. |
| 8,589,201 B2 | 11/2013 | Nielsen et al. |
| 8,589,202 B2 | 11/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,626,571 B2 | 1/2014 | Nielsen et al. |
| 8,630,463 B2 | 1/2014 | Nielsen et al. |
| 8,700,325 B2 | 4/2014 | Nielsen et al. |
| 8,775,077 B2 | 7/2014 | Nielsen et al. |
| 8,903,643 B2 | 12/2014 | Nielsen et al. |
| 9,177,280 B2 | 11/2015 | Nielsen et al. |
| 9,183,646 B2 | 11/2015 | Nielsen et al. |
| 9,256,849 B2 | 2/2016 | Nielsen et al. |
| 2002/0029161 A1 | 3/2002 | Brodersen |
| 2002/0032028 A1 | 3/2002 | Kaupe |
| 2002/0038076 A1 | 3/2002 | Sheehan et al. |
| 2002/0055870 A1 | 5/2002 | Thomas |
| 2002/0153134 A1 | 10/2002 | Newman |
| 2002/0184235 A1 | 12/2002 | Young |
| 2003/0110184 A1 | 6/2003 | Gibson et al. |
| 2003/0130820 A1 | 7/2003 | Lane, III |
| 2003/0168834 A1 | 9/2003 | Ulrich |
| 2003/0177027 A1 | 9/2003 | DiMarco |
| 2003/0177051 A1 | 9/2003 | Driscoll et al. |
| 2003/0212621 A1 | 11/2003 | Poulter |
| 2003/0216949 A1 | 11/2003 | Kram et al. |
| 2004/0215701 A1 | 10/2004 | Vrajich |
| 2004/0236620 A1 * | 11/2004 | Chauhan et al. ................ 705/9 |
| 2005/0033620 A1 | 2/2005 | Gloor et al. |
| 2005/0057745 A1 | 3/2005 | Bontje |
| 2005/0232475 A1 | 10/2005 | Floeder |
| 2005/0240649 A1 | 10/2005 | Elkington |
| 2006/0026020 A1 | 2/2006 | Waite et al. |
| 2006/0077095 A1 | 4/2006 | Tucker et al. |
| 2006/0085133 A1 | 4/2006 | Young et al. |
| 2006/0085396 A1 | 4/2006 | Evans |
| 2006/0087402 A1 * | 4/2006 | Manning et al. ............... 340/3.1 |
| 2006/0091888 A1 | 5/2006 | Holman et al. |
| 2006/0206370 A1 | 9/2006 | Skopal |
| 2006/0235741 A1 | 10/2006 | Deaton et al. |
| 2006/0245572 A1 | 11/2006 | Asher |
| 2006/0282280 A1 | 12/2006 | Stotz et al. |
| 2007/0073610 A1 | 3/2007 | Marugabandhu et al. |
| 2007/0127694 A1 | 6/2007 | Hajj et al. |
| 2007/0219722 A1 | 9/2007 | Sawyer et al. |
| 2007/0288159 A1 | 12/2007 | Skelton |
| 2008/0001009 A1 | 1/2008 | Young |
| 2008/0017416 A1 | 1/2008 | Watson |
| 2008/0025614 A1 | 1/2008 | Hintz et al. |
| 2008/0121684 A1 | 5/2008 | Gualandri |
| 2008/0137589 A1 | 6/2008 | Barrett |
| 2008/0245299 A1 | 10/2008 | Nielsen et al. |
| 2008/0288267 A1 | 11/2008 | Asher |
| 2009/0013928 A1 | 1/2009 | Nielsen et al. |
| 2009/0157746 A1 | 6/2009 | More et al. |
| 2009/0184823 A1 | 7/2009 | Tessier |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0223355 A1 | 9/2009 | Manders |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0265430 A1 | 10/2009 | Bechtel |
| 2009/0289637 A1 | 11/2009 | Radtke |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0034483 A1 | 2/2010 | Giuffrida |
| 2010/0084532 A1 | 4/2010 | Nielsen et al. |
| 2010/0085054 A1 | 4/2010 | Nielsen et al. |
| 2010/0085185 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich et al. |

(56) References Cited

U.S. PATENT DOCUMENTS

| | | |
|---|---|---|
| 2010/0117654 A1 | 5/2010 | Nielsen et al. |
| 2010/0146454 A1 | 6/2010 | Sugahara |
| 2010/0164787 A1 | 7/2010 | Khosravy et al. |
| 2010/0170453 A1 | 7/2010 | Betzer-Zilevitch |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256863 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0236656 A1 | 8/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |
| 2015/0009608 A1 | 1/2015 | Nielsen et al. |
| 2015/0170089 A1 | 6/2015 | Nielsen et al. |
| 2015/0185778 A1 | 7/2015 | Nielsen et al. |
| 2015/0193717 A1 | 7/2015 | Nielsen et al. |
| 2015/0234819 A1 | 8/2015 | Nielsen et al. |
| 2015/0253449 A1 | 9/2015 | Nielsen et al. |
| 2015/0269500 A1 | 9/2015 | Nielsen et al. |
| 2015/0339607 A1 | 11/2015 | Nielsen et al. |
| 2016/0155079 A1 | 6/2016 | Nielsen et al. |

FOREIGN PATENT DOCUMENTS

| | | |
|---|---|---|
| CA | 2458050 | 3/2003 |
| CA | 2510111 | 7/2004 |
| CA | 2641355 | 8/2007 |
| CA | 2729590 | 12/2009 |
| JP | 2005327228 A | 11/2005 |
| JP | 2006189930 A | 7/2006 |
| WO | WO9516827 | 6/1995 |
| WO | WO0228541 | 4/2002 |
| WO | WO2006013338 | 2/2006 |

OTHER PUBLICATIONS

International Search Report and Written Opinion, Application Serial No. PCT/2009/05416, Jun. 7, 2010, 11 pages.
Co-Pending U.S. Appl. No. 12/432,849, filed Apr. 20, 2009.
Co-Pending U.S. Appl. No. 12/432,860, filed Apr. 30, 2009.
Co-Pending U.S. Appl. No. 12/432,870, filed Apr. 30, 2009.
Co-Pending U.S. Appl. No. 12/432,878, filed Apr. 30, 2009.
Co-Pending U.S. Appl. No. 12/432,909, filed Apr. 30, 2009.
Co-Pending U.S. Appl. No. 12/364,339, filed Feb. 2, 2009.
Co-Pending U.S. Appl. No. 12/493,109, filed Jun. 26, 2009.
Co-Pending U.S. Appl. No. 12/537,732, filed Aug. 7, 2009.

(56) References Cited

OTHER PUBLICATIONS

Co-Pending U.S. Appl. No. 12/537,856, filed Aug. 7, 2009.
Co-Pending U.S. Appl. No. 12/537,894, filed Aug. 7, 2009.
Co-Pending U.S. Appl. No. 12/537,917, filed Aug. 7, 2009.
CGA, Common Ground Alliance, Best Practices, Version 1.0, Apr. 2003.
CGA, Common Ground, Study of One-Call Systems and Damage Prevention Best Practices, Aug. 1999.
U.S. Appl. No. 12/364,339, filed Feb. 2, 2009, Nielsen et al.
U.S. Appl. No. 12/571,356, filed Sep. 30, 2009, Nielsen et al.
U.S. Appl. No. 12/572,202, filed Oct. 1, 2009, Nielsen et al.
U.S. Appl. No. 12/572,260, filed Oct. 1, 2009, Nielsen et al.
U.S. Appl. No. 12/704,485, filed Feb. 11, 2010, Nielsen et al.
U.S. Appl. No. 12/833,103, filed Jul. 9, 2010, Nielsen et al.
U.S. Appl. No. 12/833,117, filed Jul. 9, 2010, Nielsen et al.
U.S. Appl. No. 12/833,121, filed Jul. 9, 2010, Nielsen et al.
U.S. Appl. No. 12/833,127, filed Jul. 9, 2010, Nielsen et al.
U.S. Appl. No. 12/850,187, filed Aug. 4, 2010, Nielsen et al.
U.S. Appl. No. 12/850,712, filed Aug. 5, 2010, Nielsen et al.
International Search Report and Written Opinion, Application Serial No. PCT/US2009/03810, Aug. 17, 2010.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, pp. 8-11, 79-85.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Fial.pdf.
Charlton, B.G. et al., "Auditing as a tool of public policy—The misuse of quality assurance techniques in the UK university expansion," Final draft of a paper published in European Political Science 2002; 2: 24-35.
GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the FLAME—Utility Integrates Field Applications," GeoWorld, Mar. 2007, 5 pages, online: Systems Integration Articles/Enspiria Solutions.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Oct. 11, 2011 from Canadian Application No. 2,691,780.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Dec. 6, 2011 from U.S. Appl. No. 12/432,870.
Office Action dated Dec. 7, 2011 from U.S. Appl. No. 12/537,856.
Office Action dated Dec. 9, 2011 from U.S. Appl. No. 12/493,109.
Office Action dated Dec. 12, 2011 from U.S. Appl. No. 12/537,917.
Office Action dated Dec. 13, 2011 from U.S. Appl. No. 12/537,894.
Office Action dated Dec. 19, 2011 from U.S. Appl. No. 12/571,356.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Whiting, P., "No role for quality scores in systematic reviews of diagnostic accuracy studies," BMC Medical Research Methodology, 2005, 5:19, 9 pages.
Office Action dated Feb. 14, 2012 from U.S. Appl. No. 12/833,103.
Office Action dated Feb. 29, 2012 from U.S. Appl. No. 12/704,485.
Office Action dated Feb. 29, 2012 from U.S. Appl. No. 12/833,117.
Office Action dated Feb. 29, 2012 from U.S. Appl. No. 12/833,127.
Office Action dated Mar. 1, 2012 from U.S. Appl. No. 12/833,121.
Office Action dated Apr. 4, 2012 from U.S. Appl. No. 12/572,202.
Cardno TBE, "Locating Underground Utilities Before Construction," Airport Facilities, Fall 2004, http://www.subsurfaceutilityengineering.com/articles/Locating_Utilities.asp, 2 pages.
Notice of Allowance dated Apr. 17, 2012 from U.S. Appl. No. 12/432,870.
Office Action dated May 9, 2012 from U.S. Appl. No. 12/432,909.
Office Action dated May 11, 2012 from Australian Application No. 2009300343.
Office Action dated May 22, 2012 from U.S. Appl. No. 12/432,849.
Office Action dated May 22, 2012 from U.S. Appl. No. 12/572,260.
Office Action dated May 22, 2012 from U.S. Appl. No. 12/432,878.
Office Action dated May 31, 2012 from Australian Application No. 2009300323.
Office Action dated Jun. 1, 2012 from Australian Application No. 2009300342.
Office Action dated Jun. 14, 2012 from U.S. Appl. No. 12/432,860.
Office Action dated Jul. 9, 2012 from U.S. Appl. No. 12/493,109.
Office Action dated Jul. 12, 2012 from U.S. Appl. No. 12/537,856.
Alstete, J.W., Benchmarking in Higher Education: Adapting Best Practices to Improve Quality, ASHE-ERIC Higher Education Report No. 5, 1995, 2 pages.
Cardno TBE, "Subsurface Utility Engineering Services," retrieved from http://web.archive.org, Aug. 28, 2008, 38 pages.
Office Action dated Jan. 29, 2013 from U.S. Appl. No. 12/704,485.
Office Action dated Feb. 1, 2013 from U.S. Appl. No. 12/850,187.
Office Action dated Nov. 7, 2012 from U.S. Appl. No. 12/572,202.
Office Action dated Feb. 4, 2013 from Canadian Application No. 2,729,590.
Office Action dated Feb. 6, 2013 from U.S. Appl. No. 12/833,121.
Office Action dated Feb. 12, 2013 from U.S. Appl. No. 12/833,103.
Office Action dated Feb. 12, 2013 from U.S. Appl. No. 12/833,117.
Office Action dated Feb. 12, 2013 from U.S. Appl. No. 12/833,127.
Nielsen et al., co-pending U.S. Publication No. 2013-0006718, published Jan. 3, 2013.
Dockter, L., Development of an Underground Utility Damage Prevention Plan (UUDPP) for Company XYZ, The Graduate College, University of Wisconsin-Stout, 2008, http://www2.uwstout.edu/content/lib/thesis/2008/2008dockterl.pdf.
Notice of Allowance dated Aug. 1, 2012 from U.S. Appl. No. 12/364,339.
Office Action dated Jul. 16, 2012 from Canadian Application No. 2,691,780.
Office Action dated Jul. 26, 2012 from Canadian Application No. 2,712,126.
Office Action dated Aug. 6, 2012 from U.S. Appl. No. 12/850,187.
Office Action dated Aug. 21, 2012 from U.S. Appl. No. 12/537,894.
Office Action dated Aug. 21, 2012 from U.S. Appl. No. 12/537,917.
Office Action dated Sep. 25, 2012 from Australian Application No. 2010214066.
Office Action dated Oct. 15, 2012 from U.S. Appl. No. 12/850,712.
Office Action dated Jul. 17, 2014 from U.S. Appl. No. 12/537,894.
Office Action dated Jul. 30, 2014 from U.S. Appl. No. 12/572,202.
Office Action dated Jul. 31, 2014 from U.S. Appl. No. 12/833,121.
Office Action dated Aug. 4, 2014 from U.S. Appl. No. 12/833,127.
Office Action dated Jul. 31, 2014 from U.S. Appl. No. 12/833,117.
U.S. Appl. No. 14/075,011, filed Nov. 8, 2013, Nielsen et al.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].

(56) References Cited

OTHER PUBLICATIONS

Bauer, S. et al., "Quantification of groundwater contamination in an urban area using integral pumping tests," Journal of Contaminant Hydrology; vol. 75, Issues 3-4; Dec. 2004, pp. 183-213.
Final Office Action dated Mar. 7, 2013 from U.S. Appl. No. 12/432,860.
Holder, T. et al., A new approach for source zone characterization: The Neckar Valley study. Groundwater Quality: Remediation and Protection, IAHS Publication, vol. 250, IAHS Press, Wallingford, Oxfordshire, UK, pp. 49-55.
Maqsood, I et al., Simulation-based risk assessment of contaminated sites under remediation scenarios, planning periods, and land-use patterns-a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from Sep. 21-25, 1998.
Notice of Allowance dated May 20, 2013 from U.S. Appl. No. 12/432,860.
Notice of Allowance dated Jun. 21, 2013 from U.S. Appl. No. 12/572,260.
Notice of Allowance dated Aug. 21, 2013 from U.S. Appl. No. 12/850,187.
Notice of Allowance dated Nov. 26, 2013 from U.S. Appl. No. 12/833,103.
Notice of Allowance dated Dec. 16, 2013 from U.S. Appl. No. 12/704,485.
Office Action dated Jan. 15, 2014 from U.S. Appl. No. 12/432,909.
Office Action dated Feb. 11, 2014 from Canadian Application No. 2,729,590.
Office Action dated Feb. 11, 2014 from U.S. Appl. No. 12/432,849.
Office Action dated Feb. 20, 2014 from Canadian Application No. 2,691,780.
Office Action dated Mar. 7, 2014 from U.S. Appl. No. 12/432,878.
Office Action dated Mar. 26, 2014 from U.S. Appl. No. 12/537,917.
Office Action dated Mar. 27, 2013 from U.S. Appl. No. 12/850,712.
Office Action dated Apr. 9, 2014 from U.S. Appl. No. 12/537,732.
Office Action dated Apr. 18, 2013 from U.S. Appl. No. 12/571,356.
Office Action dated Apr. 24, 2013 from U.S. Appl. No. 12/432,909.
Office Action dated Apr. 29, 2013 from U.S. Appl. No. 12/432,849.
Office Action dated May 22, 2014 from U.S. Appl. No. 12/850,712.
Office Action dated May 23, 2013 from U.S. Appl. No. 12/572,202.
Office Action dated May 23, 2014 from U.S. Appl. No. 12/537,894.
Office Action dated May 26, 2014 from Canadian Application No. 2,776,434.
Office Action dated Jun. 3, 2013 from Canadian Application No. 2,691,780.
Office Action dated Jun. 10, 2014 from U.S. Appl. No. 13/465,524.
Office Action dated Jun. 19, 2013 from U.S. Appl. No. 12/704,485.
Office Action dated Jun. 19, 2013 from U.S. Appl. No. 12/833,103.
Office Action dated Jun. 20, 2013 from U.S. Appl. No. 12/833,117.
Office Action dated Jun. 20, 2013 from U.S. Appl. No. 12/833,127.
Office Action dated Jun. 25, 2013 from U.S. Appl. No. 12/833,121.
Office Action dated Aug. 21, 2013 from Canadian Application No. 2,739,110.
Office Action dated Aug. 29, 2013 from Canadian Application No. 2,739,090.
Office Action dated Aug. 29, 2013 from U.S. Application No. 13/465,524.
Office Action dated Sep. 24, 2013 from Canadian Application No. 2,739,090.
Office Action dated Sep. 24, 2013 from Canadian Application No. 2,739,094.
Office Action dated Oct. 10, 2013 from U.S. Appl. No. 12/850,712.
Office Action dated Oct. 16, 2013 from Canadian Application No. 2,691,780.
Office Action dated Oct. 31, 2013 from U.S. Appl. No. 12/572,202.
Office Action dated Nov. 12, 2013 from Canadian Application No. 2,712,126.
Patent Examination Report No. 2, Australian Application No. 2009300323, May 29, 2013.
Patent Examination Report No. 2, Australian Application No. 2009300342, Jul. 1, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Turner, R., "Standard Operating Procedures," *Appendix A for Sampling and Analysis Plan for Interim Groundwater Monitoring Site 3 - Ninth Street Landfill* (Tetra Tech NUS, 2008), retrieved online at: Horsham Township Library: Willow Grove Naval Air Station Administrative Record Index <http://htl.mclinc.org/%5CWillowGroveNASAdminRecord%5CPdfs%5CFnial21345_appendA.pdf.
Nielsen et al., co-pending U.S. Pat. No. 8,612,148, issued Dec. 17, 2013.
U.S. Appl. No. 14/579,223, filed Dec. 22, 2014, Nielsen et al.
Notice of Allowance dated Oct. 24, 2014 from U.S. Appl. No. 14/075,011.
Office Action dated Jan. 12, 2015 from U.S. Appl. No. 12/571,356.
Office Action dated Feb. 9, 2015 from Canadian Application No. 2,729,590.
Office Action dated Feb. 11, 2015 from U.S. Appl. No. 12/493,109.
Office Action dated Dec. 18, 2014 from U.S. Appl. No. 12/537,917.
Office Action dated Sep. 2, 2014 from Canadian Application No. 2,729,590.
Office Action dated Sep. 29, 2014 from Canadian Application No. 2,691,780.
Patent Examination Report dated Sep. 5, 2014 from Australian Application No. 2010358572.
Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC v. S&N Locating Services, LLC et al.*, (Eastern District of Virginia) (Parts 1, 2, 3 and 4).
Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC v. S&N Locating Services, LLC et al.*, (Eastern District of Virginia).
CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC v. S&N Locating Services, LLC et al.*, (Eastern District of Virginia).
Memorandum Order filed Aug. 7, 2015; Case 2:13-cv-00346-MSD-TEM; *CertusView Technologies, LLC v. S&N Locating Services, LLC et al.*, (Eastern District of Virginia).
Opinion and Order Following Motion for Judgment on Pleadings, Jan. 21, 2015; Case 2:13-cv-00346-MSD-LRLVAED *CertusView Technologies, LLC v. S&N Locating Services*; (Eastern District of Virginia).
Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit a to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).

(56) References Cited

OTHER PUBLICATIONS

Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

CertusView's Response in Opposition to S&N's Motion for Exceptional Case Finding and Attorneys' Fees filed Feb. 27, 2015; Case 2:13-cv-00346-MSD-TEM; *CertusView Technologies, LLC* v. *S&N Locating Services, LLC et al.*, (Eastern District of Virginia).

Reply in Support of Defendants' Motion for Exceptional Case Finding and Attorneys' Fees filed Mar. 9, 2015; *CertusView Technologies, LLC* v. *S&N Locating Services, LLC et al.*, (Eastern District of Virginia).

Memorandum Order regarding Functional Equivalency Objections and Sanctions Objections filed Mar. 11, 2015; *CertusView Technologies, LLC* v. *S&N Locating Services, LLC et al.*, (Eastern District of Virginia).

Office Action dated Mar. 25, 2015 from U.S. Appl. No. 14/063,417.

S&N Locating Services, LLC's and S&N Communications, Inc.'s First Amended Answer, Affirmative Defenses, and Counterclaims to Plaintiff's First Amended Complaint filed Jan. 23, 2015; Case No. 2:13- cv-346 (MSD) (TEM); *CertusView Technologies, LLC* v. *S&N Locating Services, LLC et al.*, (Eastern District of Virginia).

CertusView's Objections to The Magistrate Judge's Order Allowing S&N's Amended Answer and Counterclaims filed Feb. 2, 2015; Case No. 2:13-cv-346 (MSD) (TEM); *CertusView Technologies, LLC* v. *S&N Locating Services, LLC et al.*, (Eastern District of Virginia).

Office Action dated Mar. 20, 2015 from U.S. Appl. No. 12/572,202.
Office Action dated Mar. 19, 2015 from U.S. Appl. No. 12/833,121.
Office Action dated Mar. 19, 2015 from U.S. Appl. No. 12/833,127.
Office Action dated Mar. 20, 2015 from U.S. Appl. No. 12/833,117.
Office Action dated Apr. 8, 2015 from U.S. Appl. No. 12/432,878.
Notice of Allowance dated Apr. 8, 2015 from U.S. Appl. No. 14/665,518.

(56) References Cited

OTHER PUBLICATIONS

Office Action dated Mar. 20, 2015 from Canadian Application No. 2,739,110.
Office Action dated Mar. 17, 2015 from Canadian Application No. 2,712,126.
Office Action dated Mar. 17, 2015 from Canadian Application No. 2,739,090.
First Action Interview Pre-Interview Communication dated Apr. 23, 2015 from U.S. Appl. No. 14/332,352.
Grant, Anthony M., Workplace, Executive and Life Coaching: An Annotated Bibliography from the Behavioural Science Literature, Coaching Publications from 1937 to Jul. 2008, 87 pages.
Office Action dated Apr. 24, 2015 from Canadian Application No. 2,776,434.
Office Action dated May 7, 2015 from U.S. Appl. No. 12/537,894.
Office Action dated Jun. 5, 2015 from U.S. Appl. No. 12/537,856.
Section 330523-1 Guidelines for Utility Horizontal Directional Borings, published on Oct. 26, 2007 at www.nashville.gov, 9 pages.
S&N Locating Services, LLC's and S&N Communications, Inc.'s Second Amended answer, Affirmative Defenses, and Counterclaims to Plaintiff's First Amended Complaint filed Jun. 12, 2015; Case No. 2:13-cv-346 (MSD) (TEM); *CertusView Technologies, LLC* v. *S&N Locating Services, LLC et al.*, (Eastern District of Virginia).
Notice of Filing of Defendants' Second Amended Answer and Counterclaims filed Jun. 12, 2015; Case No. 2:13-cv-346 (MSD) (TEM); *CertusView Technologies, LLC* v. *S&N Locating Services, LLC et al.*, (Eastern District of Virginia).
Notice of Allowance dated Mar. 15, 2016 from U.S. Appl. No. 15/018,751.
Notice of Allowance dated Oct. 9, 2015 from U.S. Appl. No. 14/802,679.
Office Action dated Oct. 7, 2015 from U.S. Appl. No. 12/493,109.
Office Action dated Sep. 25, 2015 from U.S. Appl. No. 14/332,352.
Notice of Allowance and Issue Fee Due dated Jul. 31, 2015 from U.S. Appl. No. 12/571,356.
Notice of Allowance dated Aug. 7, 2015 from U.S. Appl. No. 12/572,202.
Office Action dated Aug. 5, 2015 from U.S. Appl. No. 13/465,524.
Office Action dated Aug. 11, 2015 from U.S. Appl. No. 12/537,917.
Supplemental Notice of Allowability dated Aug. 25, 2015 from U.S. Appl. No. 12/833,121.
Supplemental Notice of Allowability dated Aug. 31, 2015 from U.S. Appl. No. 12/572,202.
Examiner's Answer to Appeal Brief dated Aug. 20, 2015 from U.S. Appl. No. 12/432,909.
Examiner's Answer to Appeal Brief dated Aug. 20, 2015 from U.S. Appl. No. 12/537,732.
Examiner's Answer to Appeal Brief dated Aug. 28, 2015 from U.S. Appl. No. 12/543,849.
CertusView's Reply in Support of its Motion to Strike and in the Alternative Dismiss S&N's First Amended Answer and Counterclaims filed Mar. 2, 2015; *CertusView Technologies, LLC* v. *S&N Locating Services, LLC et al.*, (Eastern District of Virginia).
CertusView's Request for Leave to File a Sur-Reply in Support of its Opposition to Defendants' Motion for Attorney's Fees filed Mar. 18, 2015; *CertusView Technologies, LLC* v. *S&N Locating Services, LLC et al.*, (Eastern District of Virginia).
Defendants' Response to CertusView's Motion to Strike and in the Alternative Dismiss S&N's First Amended Answer and Counterclaims filed Feb. 23, 2015; *CertusView Technologies, LLC* v. *S&N Locating Services, LLC et al.*, (Eastern District of Virginia).
Defendants' Response to CertusView's Objections to the Magistrate Judge's Order Allowing S&N's Amended Answer and Counterclaims filed Feb. 17, 2015; Case 2:13-cv-00346-MSD-TEM; *CertusView Technologies, LLC* v. *S&N Locating Services, LLC et al.*, (Eastern District of Virginia).
Defendant's Response to CertusView's Objections to the Magistrate Judge's Order Awarding Sanctions on S&N's Motion to Compel filed Feb. 23, 2015; *CertusView Technologies, LLC* v. *S&N Locating Services, LLC et al.*, (Eastern District of Virginia).
Opinion and Order to Plaintiffs Rule 72 Objections to the Magistrate Judge's Jan. 16, 2015 Order Granting Defendants Leave to Amend their Answer and Counterclaims, and on Plaintiffs Motion to Strike and in the Alternative Dismiss S&N's First Amended Answer and Counterclaims, filed May 22, 2015; *CertusView Technologies, LLC* v. *S&N Locating Services, LLC et al.*, (Eastern District of Virginia).
Responsive Expert Report of Dr. Randel Dymond, P.E. to the Expert Report of Mr. Ivan Zatkovich dated Sep. 30, 2014, filed Nov. 13, 2014; *CertusView Technologies, LLC* v. *S&N Locating Services, LLC et al.*, (Eastern District of Virginia).
Nielsen et al., co-pending U.S. Publication No. 2015-0339607, published Nov. 26, 2015.
Opinion and Order filed Aug. 2, 2016; Case 2:13-cv-346-MSD-RJK; *CertusView Technologies, LLC* v. *S&N Locating Services, LLC et al.*, (Eastern District of Virginia).
Opinion and Order Denying Plaintiffs Motion for Partial Reconsideration of the Court's Judgment of Patent Ineligibility under 35 U.S.C. § 101 filed Aug. 10, 20116; Case 2:13-cv-346-MSD-RJK; *CertusView Technologies, LLC* v. *S&N Locating Services, LLC et al.*, (Eastern District of Virginia).
Transcript of Bench Trial Proceedings, vol. 1A, pp. 1-89, Mar. 8, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 2B (Afternoon Session), Mar. 8, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 2A, pp. 99-216, Mar. 9, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 2B (Afternoon Session), Mar. 9, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 3A, pp. 429-554, Mar. 10, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 3B, (Afternoon Session), Mar. 10, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 4A (Morning Session), Mar. 11, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 4B, pp. 779-921, Mar. 11, 2016; Case 2:13-cv-346-MSD-RJK; *CertusView Technologies, LLC* v. *S&N Locating Services, LLC et al.*, (Eastern District of Virginia).
Transcript of Bench Trial Proceedings, vol. 5A, pp. 922-1065, Mar. 14, 2016; Case 2:13-cv346-MSD-RJK; *CertusView Technologies, LLC* v. *S&N Locating Services, LLC et al.*, (Eastern District of Virginia).
Transcript of Bench Trial Proceedings, vol. 5B, (Afternoon Session), Mar. 14, 2016; Case 2:13-cv-346-MSD-RJK; *CertusView Technologies, LLC* v. *S&N Locating Services, LLC et al.*, (Eastern District of Virginia).
Notice of Allowance dated Jul. 10, 2015 from U.S. Appl. No. 12/833,121.
Office Action dated Jul. 7, 2015 from Canadian Application No. 2,739,094.
Patent Examination Report dated Jun. 29, 2015 from Australian Application No. 2014201054.
Office Action dated Apr. 8, 2016 from U.S. Appl. No. 12/537,894.
Notice of Allowance mailed Jul. 28, 2016 from U.S. Appl. No. 15/018,751.

\* cited by examiner

FIG. 3

Reject QC Popup Window
800

| CROSS STREET: Harford | Reject Quality Control Request _ □ X |
|---|---|
| WORK PERFORMED | Reason to Reject Quality Control Request: |
| MEMBER CODES: BGEBC—M BGEBCG—NC VBT—N | 810  812 ✓ ⊗ |
| | ○Internet  🔍100% |
| | Additional Information: This is a placeholder for additional information that was provided by the supervisor. |

*FIG. 8*

Coaching Popup Window
900

| CROSS STREET: Harford | Send for Coaching _ □ X |
|---|---|
| WORK PERFORMED | Coaching Reason: |
| MEMBER CODES: BGEBC—M BGEBCG—NC VBT—N | 910  912 ✓ ⊗ |
| | ○Internet  🔍100% |
| | Reasons(s) for Quality Control: Member utility not seen as noted on manifest. VBT on manifest but has not been marked. |

*FIG. 9*

TICKET APPROVAL SYSTEM FOR AND METHOD OF PERFORMING QUALITY CONTROL IN FIELD SERVICE APPLICATIONS

CROSS-REFERENCE TO RELATED APPLICATIONS

This patent application claims priority to U.S. Provisional Application Ser. No. 61/076,253, filed in the U.S. Patent and Trademark Office on Jun. 27, 2008 by Nielsen et al., and is a continuation-in-part of U.S. application Ser. No. 12/029,732, filed in the U.S. Patent and Trademark Office on Feb. 12, 2008 by Nielsen et al., now U.S. Pat. No. 8,532,342, issued on Sep. 10, 2013, the entire contents of each of these applications being incorporated herein by reference in its entirety.

BACKGROUND

1. Technical Field

The present disclosure generally relates to quality control in field service applications. In particular, the present disclosure is directed to a work order approval system and method of performing quality control in field service applications, such as locate operations.

2. Description of the Related Art

Field service applications may be any application in which companies dispatch technicians and/or other staff into the field in order to perform, for example, certain installations, services, and/or repairs. Field service applications may exist in industries, such as, but not limited to, network installations, utility installations, security systems, construction, medical equipment, heating, ventilating, and air conditioning (HVAC), and the like.

In certain field service applications, there may be an associated work order for each field call. These work orders are hereafter referred to as tickets. The ticket information may include, for example, the physical address or other location information to which the field technician is dispatched, the type of installation service, and/or repair that is requested. Depending on the field service application, certain processes may exist for verifying certain aspects of the installations, services, and/or repairs that are to be performed by the field service technicians according to the ticket information. Since there may be numerous field technicians, each of whom are assigned numerous tickets, implementing and performing meaningful oversight and quality control activities in a timely fashion may be difficult. As a result of the limited quality control activities in certain field service applications, customer satisfaction may be adversely affected. Additionally, the time, effort, and cost that is associated with re-performing work in the field or with correcting and/or improving poorly performed field calls may be unacceptable.

Consequently, a need exists for methods of providing oversight and quality control in field service applications in order to improve customer satisfaction, to identify and reduce the number of poorly performed tickets, and to improve visibility into distributed workforce operations. More specifically, a need exists for improved approaches to quality control in the underground facility locate industry in order to improve customer satisfaction and to reduce the risk of damage to underground facilities due to poorly performed locate operations.

SUMMARY

According to one aspect of the present disclosure, a method of performing quality control in a field service application is presented. The method includes obtaining a ticket, performing at least one task associated with the ticket, collecting data associated with at least one task, and transmitting the data to a work management server. The method further includes reviewing the data received by the approval application for quality control purposes. The work management server includes a database and an approval application.

According to another aspect of the present disclosure, a method of performing quality control in a field service application is provided. The method includes obtaining a ticket associated with a determination of a presence or an absence of at least one underground facility, and determining the presence or absence of at least one underground facility. The method further includes performing at least one task resulting from the step of determining, generating and collecting data associated with a dig area defined in the ticket, transmitting the data to a work management server, and reviewing the data received by the approval application for quality control purposes. Further, the work management server includes a database and an approval application.

According to a further aspect of the present disclosure, a system for maintaining quality control in a field service application is presented. The system includes a ticket with a work order and a dig area associated with the work order, a locate technician to determine a presence or an absence of at least one underground facility, and an image capture mechanism to obtain data associated with the ticket. The system also includes a work management server and a network to transmit the data associated with the ticket to the work management server. The work management server includes a database and a ticket approval application and the ticket approval application is a software application that provides a graphical computerized mechanism for an approver to perform a quality control review.

According to yet another aspect of the present disclosure, a system is presented. The system includes a ticket with a work order and a dig area associated with the work order. The ticket is associated with at least one task and the task includes marking for a presence or an absence of at least one underground facility. The system also includes a locate technician to perform at least one task associated with the ticket, an image capture mechanism to obtain data associated with the ticket, a work management server, and a network. The work management server includes a database and a ticket approval application. Further, the network transmits the data associated with the ticket and the performance of at least one task associated with the ticket to the work management server.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

FIG. 3 illustrates an example of an approver inbox GUI for use in the ticket approval system, in accordance with the present disclosure;

FIG. 8 illustrates an example of a reject QC popup window for use in the ticket approval system, in accordance with the present disclosure;

FIG. 9 illustrates an example of a coaching popup window for use in the ticket approval system, in accordance with the present disclosure;

DETAILED DESCRIPTION OF EXEMPLARY EMBODIMENTS

Figure 1:
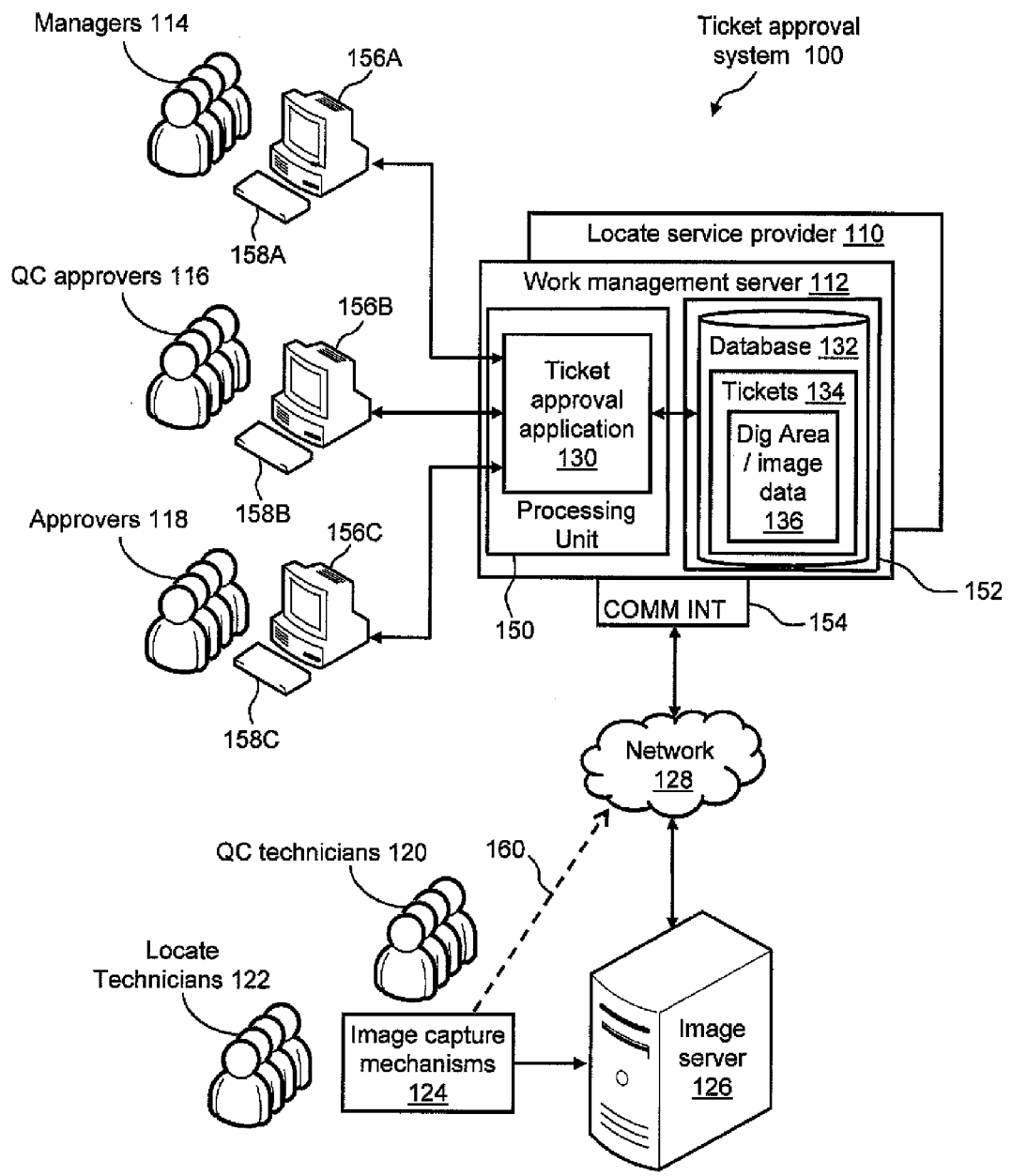
FIG. 1 illustrates a functional block diagram of an example of a ticket approval system for performing oversight and quality control, in accordance with the present disclosure.

The following detailed description refers to the accompanying drawings. The same reference numbers in different drawings may identify the same or similar elements. In addition, the following detailed description does not limit the present disclosure.

In the discussion that follows, the term "dig area" means any specified geographic area within which excavation may occur, the term "excavation" means disturbing or penetrating the ground, the term "excavation area" means the ground where excavation occurs or will occur, and the term "facility owner" means an owner, an operator, or a third party contractor that provides the services of a locate operation and/or a marking operation to a facility owner as an agent or otherwise. Examples of a facility owner may include, but are not limited to, a gas company, a water company, a sewer company, a power company, a telephone company, or a cable company. In addition, the term "image" means any image, depiction, and/or visual representation. An image may be, but is not limited to, images captured or stored in any human or machine readable format.

Further, the term "locate device" means any apparatus and/or device for detecting and/or inferring the presence or absence of any facility, including without limitation, any underground facility, the term "locate mark" means any mark, sign, and/or other means indicating the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof. The term "locate operation" means any activity to detect or infer the presence or absence of an underground facility, and the term "marking operation" means any activity to mark the presence or absence of an underground facility. In addition, the term "locate technician" means an individual performing a locate or a locate operation. The term "manifest" means any record in any form that comprises information relating to a locate or a locate operation. A manifest may include separately or in combination, and without limitation, information concerning a dig area, environmental landmarks, type and approximate geographic location of the presence or absence of at least one locate mark, time, date and duration of the locate operation, facility owner(s), party requesting a locate operation, identity of the locate technician, and/or notes of the locate technician.

The term "marking device" means any apparatus, mechanism, or other means of employing a marking dispenser for causing a marking material and/or marking object to be dispensed, and the term "marking dispenser system" means a system including, but not limited to, a marking device, a marking dispenser, and an actuator. Further, the term "marking object" means any object and/or objects used or which may be used separately or in combination to mark, signify, and/or indicate. Examples of marking objects may include, but are not limited to, a flag and/or an RFID marking ball, and the term "marking material" means any material, substance, compound, and/or element, used or which may be used separately or in combination to mark, signify, and/or indicate. Examples of marking materials may include, but are not limited to, paint, chalk, dye, and/or iron.

Additionally, the term "facility" means one or more lines, cables, fibers, conduits, transmitters, receivers, or other physical objects or structures capable of or used for carrying, transmitting, receiving, storing, and providing utilities, energy, data, substances, and/or services, and/or any combination thereof, and the term "underground facility" means any facility beneath the surface of the ground. Examples of facilities include, but are not limited to, oil, gas, water, sewer, power, telephone, data transmission, cable TV, and/or internet services.

The present disclosure includes a method and system of performing oversight and quality control in field service applications, such as locate operations, and ticket approval systems. The ticket approval system of the present disclosure provides a mechanism by which approvers and/or managers may review the quality of locate operations in real time and/or within a certain amount of time (e.g., within one day) of the locate operation. In particular, a ticket approval software application of the present disclosure provides a graphical computerized mechanism for viewing the information, such as images, that is associated with locate operations, which allows for a rapid and efficient processing of tickets. Examples of images include, but are not limited to, digital images, aerial images, and so on. In doing so, approvers and/or managers may assess the quality of each locate operation in a time efficient manner. Based on the assessment, locate operations may be categorized in a variety of ways, for example: (1) approved, no further action needed; (2) satisfactory, but the locate technician needs coaching or training; or (3) unsatisfactory, the ticket needs quality control (QC) action. While approvers may be required to assess all tickets of the locate technicians under their supervision, a random subset of tickets may be selected for higher managerial review, adding a further level of quality assurance.

The ticket approval system of the present disclosure maintains a numerical count of approved tickets, coaching referrals, and QC referrals. In the case of QC referrals, the ticket may require immediate dispatch to the original locate technician or a QC technician. QC referrals may be considered high priority and, therefore, routed to the next available time slot of the locate or QC technician, in order to correct defects in a timely manner.

The method and system of the present disclosure may be used in a locate operation. Man-made objects, such as facilities, and in particular, underground facilities (e.g., gas, water, sewer, power, telephone, and cable television lines), are susceptible to damage from various things, such as from excavation. Local and federal laws may require that notification be given to facility owners that own underground facilities in an excavation area before any excavation takes place. If such notification is received, the facility owner typically locates and marks the location of the underground facilities. By way of example, the facility owner may use a ticket approval system for and method of performing oversight and quality control during a locate operation, as described herein.

Locate operations may be performed, for example, by the facility owner. A marking dispenser system is typically used to create locate marks. Paint is commonly used as the marking material, and it is typically applied using a marking device. The color of the marking material is typically chosen based on the type of underground facility that is being marked (e.g., red paint for a power line).

Protocols may exist for verifying certain aspects of locate operations that are performed by locate technicians. For example, for each locate operation, the locate technician may be required to provide certain evidence (e.g., photographs) that may be used in order to verify (against the original ticket) the actual address at which the locate operation was performed versus the requested address, the actual locate operations that were performed versus the requested locate operations, and to provide proof that the locate operation was actually performed (i.e., proof of "locate marks").

The system of the present disclosure provides a mechanism by which approvers and/or managers may review the quality of locate operations in real time and/or within a certain amount of time (e.g., within one day). In particular, a ticket approval software application of the present disclosure provides a graphical computerized mechanism for viewing the information, for example, digital information, markings, and images, that is associated with the locate operations, which allows rapid and efficient processing of tickets.

Further, approvers and/or managers may quickly assess the quality of each locate operation. Based on the assessment, locate operations may be categorized as, for example, (1) approved, no further action needed, (2) satisfactory, but the locate technician needs coaching or training, or (3) unsatisfactory, the ticket needs quality control (QC) action. While approvers may be required to assess all tickets of the locate technician under their supervision, a random and/or rules-based subset of tickets may be selected for higher managerial review, adding a further level of oversight and quality assurance.

The ticket approval system of the present disclosure maintains, for example, a numerical count of approved tickets, coaching referrals and QC referrals. In the case of QC referrals, the ticket may require immediate dispatch to the original locate technician or a QC technician. QC referrals may be considered high priority and, therefore, routed to the next available time slot of the locate technician or QC technician in order to correct any defects prior to the start of excavation.

Referring to FIG. 1, a functional block diagram of a system 100 for performing oversight and quality control in locate operations is provided. System 100 may include a locate service provider 110, which may be any facility owner. Additionally, system 100 may include a work management server 112, which is maintained and operated by locate service provider 110, and which may be any local or centralized computing device, including a processing unit 150, a memory 152, and a communication interface 154, that is capable of hosting an application such as a ticket approval application 130, as discussed further below. In implementation, work management server 112 may be a networked application and/or web server.

Personnel that are associated with system 100 may include, but are not limited to, managers 114, QC approvers 116, approvers 118, QC technicians 120, and locate technicians 122 of locate service provider 110. Managers 114 may be high-level managers of locate service provider 110, including directors and/or company executives of locate service provider 110 that oversee QC approvers 116, approvers 118, QC technicians 120 and locate technicians 122. Managers 114 may interact with the ticket approval application 130 via a display device 156A and a user input device 158A coupled to the work management server 112. It is contemplated that managers 114, QC approvers 116, approvers 118, QC technicians 120 and other locate technicians 122 may also serve in a QC capacity according to the present disclosure.

QC approvers 116 may be the individuals that are responsible for processing any QC referrals and to whom QC technicians 120 may report. QC approvers 116 may interact with the ticket approval application 130 via a display device 156B and a user input device 158B coupled to the work management server 112. QC technicians 120 are technicians that are dispatched into the field for performing QC activities. Approvers 118 may be the direct supervisors of locate technicians 122. Approvers 118 may interact with the ticket approval application 130 via a display device 156C and a user input device 158C coupled to the work management server 112. Further, managers 114, QC approvers 116, and/or approvers 118 may be the personnel of the customers of locate service provider 110. For example, managers 114, QC approvers 116, and/or approvers 118 may be service managers of the customers of locate service provider 110 who wish to verify the quality of the workflow of locate service provider 110.

Referring again to FIG. 1, system 100 may include various image capture mechanisms 124 by which QC technicians 120 and locate technicians 122 provide images of the dig area while performing locate operations. In an example, image capture mechanism 124 is a consumer or professional grade digital still or video camera. In another example, image capture mechanism 124 is the device for providing an electronic manifest of underground facility locate marks that is described in U.S. patent application Ser. No. 12/029,732 (the "'732 patent application"), entitled "Electronic manifest of underground facility locate marks," that is incorporated by reference herein in its entirety.

Image capture mechanism 124 may be used to obtain an image used to verify the address of the locate operation, to verify the ticket information of the locate operation, and/or to provide proof that the locate operation was actually performed. For example, image capture mechanism 124 may be used to provide an image of something that identifies the location of the dig area, such as an image that shows the street number on a mailbox or on a building or a serial number on a telephone pole. In an exemplary embodiment, certain digital cameras and other devices have geographic or global positioning system (GPS) technology integrated therein, which allows GPS data (i.e., dig area data) to be stored with the image data. In this case, the GPS data may be used as the dig area identifier mechanism. In addition, image capture mechanism 124 may be used to provide an image of a manifest or similar log of the ticket, dig area and locate marks. Furthermore, image capture mechanism 124 may be used to provide an image of the dig area showing locate marks.

Dig area and image (dig area/image) data from image capture mechanisms 124 may be transmitted to and stored on, for example, an image server 126. Each image from image capture mechanisms 124 is associated with a certain ticket. Image server 126 is connected to the work management server 112 via a wired or wireless network 128. Network 128 is, for example, a wide area network (WAN), a local area network (LAN), a telephone network, such as the Public Switched Telephone Network (PSTN) or a cellular network, an Internet connection, an Intranet connection, one or more communication links, and/or a combination of networks. Also, dig area/image data from image capture mechanism 124 may be transmitted directly to work management server 112, as shown by communication link 160.

As noted above, work management server 112 includes a ticket approval application 130 that is implemented via processor-executable instructions executed by processing unit 150 and a database 132 stored in memory 152. Database 132, created and maintained by any suitable database software, stores relationships between, for example, dig area/image data captured by image capture mechanism 124, tickets 134, locate technicians 122 and approvers 118. For example, database 132 may store tickets 134 and associated dig area/image data 136.

In an embodiment, ticket approval application 130 is a software application that provides a graphical computerized mechanism for performing oversight and quality control in a locate operation. Additional details relating to an example of a method of using implemented by the ticket approval application 130 in an oversight and quality control operation are described with reference to FIG. 2. Further, additional details of example GUIs of ticket approval application 130 that may be displayed on one or more of display devices 156A, 156B and 156C are described with reference to FIGS. 3 through 11.

The features of ticket approval application 130 of system 100 of the present disclosure may include, but are not limited to, the following:

a mechanism by which approvers may review tickets rapidly in real time and/or within a certain amount of time (e.g., within one day) from the ticket being executed;

a mechanism by which dig area/image data that is associated with approved tickets may be stored with the appropriate ticket(s) as a part of the archival process;

a mechanism by which a numerical count of approved tickets, coaching referrals, and QC referrals, may be maintained for different levels of the system;

a mechanism by which, while QC approvers 116 may be required to review all tickets of all locate technicians 122 under their supervision, a random and/or rules-based subset of tickets may be selected for higher managerial review, which adds a further level of quality assurance;

a mechanism by which tickets that are tagged for QC referral may be dispatched immediately to the original locate technician, QC technician, and/or another locate technician;

a mechanism by which substantially all tasks that are associated with a QC referral may be completed the same day as dispatched and the manifest is revised to reflect any changes that are made on site;

a mechanism by which QC referrals that are not completed on the same business day as referred may be flagged for managerial review and handling;

a mechanism by which approvers 118 may log and track coaching referrals;

a mechanism by which received data is interrogated against various aspects and limitations, such as time to complete work, cost to complete work, conditions at the work site, time the work was performed (proper or improper time), efficiency with which the work was performed, and the like, to provide exception notifications relating to certain reviewed tickets that can be flagged for review by approver 118;

a mechanism by which coaching opportunities that are not completed within a certain amount of time, for example, within ten business days, may be flagged for managerial review and handling; and a mechanism by which substantially all documentation may be auto-archived, for example, in database 132 of work management server 112 as well as in employee personnel files (e.g., human resources files) for use, for example, with tracking employee information and performance evaluation scoring.

Figure 2:
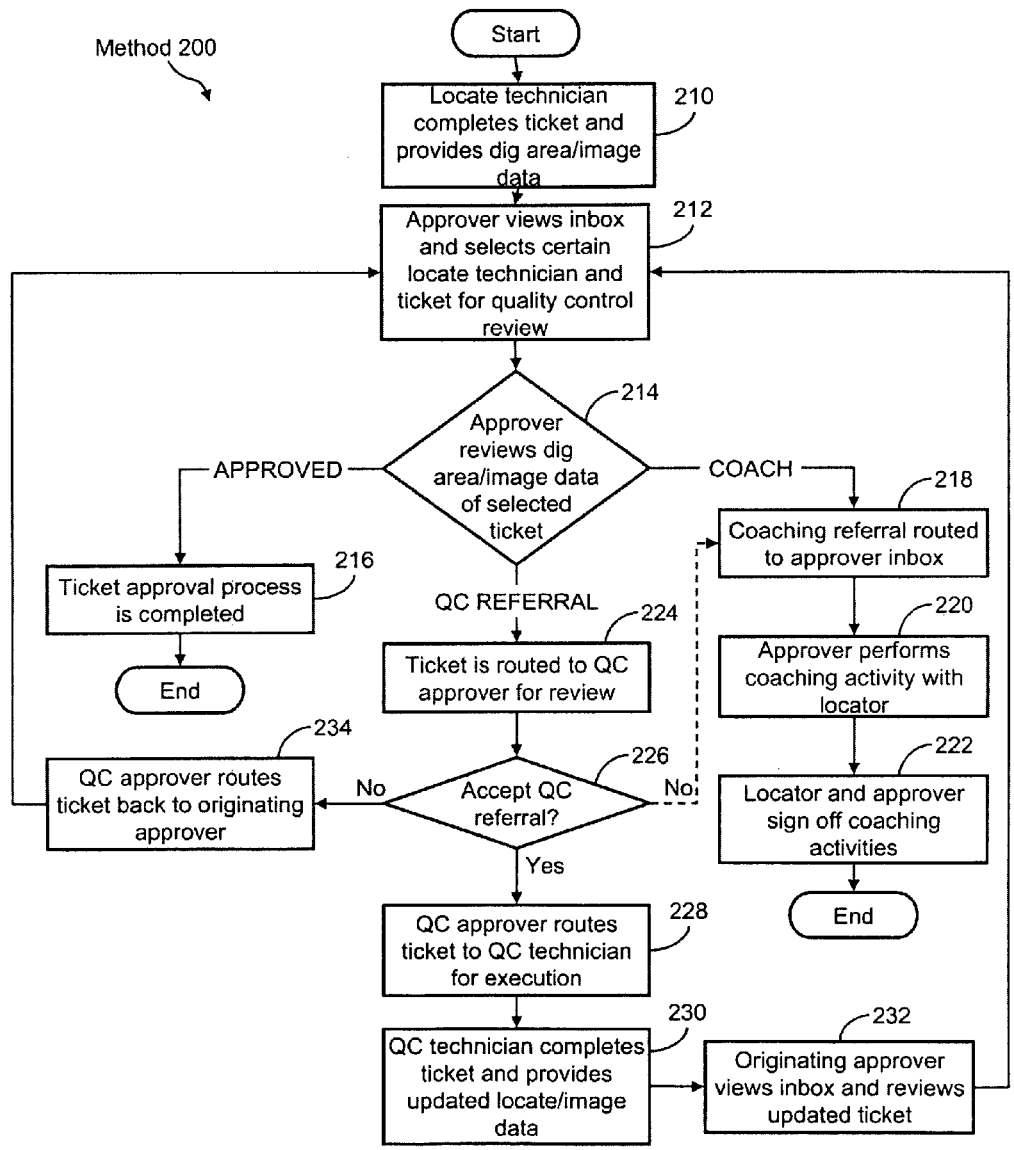
FIG. 2 illustrates a flow diagram of an example of a method of performing oversight and quality control using the ticket approval system, in accordance with the present disclosure.

Turning now to FIG. 2, a flow diagram of an example of a method 200 of performing oversight and quality control in a locate operation using system 100 is presented. Method 200 may include, but is not limited to, the following steps, which may be implemented in any order.

At step 210, the locate technician completes the ticket and provides dig area data. For example, locate technician 122 is assigned a certain ticket and is dispatched to a specific dig area to perform a locate operation. In the process of performing the locate operation, locate technician 122 captures the required dig area/image data via image capture mechanism 124. In an example, when image capture mechanism 124 is a digital camera, locate technician 122 provides a digital photograph that shows the street number on a building, another digital photograph of the paper manifest, and another digital photograph of the dig area, showing locate marks. Additionally, when image capture mechanism 124 is the device and method of the '732 patent application, the images of the dig area, showing locate marks, are in the form of an image of the dig area that has locate marks electronically overlaid thereon. These locate marks denote the presence of facilities. The device and method of the '732 patent application provide alternative mechanisms for automatically providing dig area identification information and manifest information in electronic form for importing into ticket approval application 130.

Upon completion of the locate operation, the dig area/image data of image capture mechanism 124 may be transmitted to image server 126 or directly to work management server 112. In doing so, the dig area/image data is accessible to ticket approval application 130. Additionally, an association is formed between the dig area/image data and the ticket. This association between the dig area/image data and the ticket is maintained throughout the steps of the oversight and quality control method of the present disclosure.

At step 212, an approver opens the ticket approval application 130 and selects a certain locate technician and ticket for quality control review. Each approver 118 is responsible for a certain group of locate technicians 122. This approver-specific group of locate technicians 122 may be called an approver group.

Figure 3:
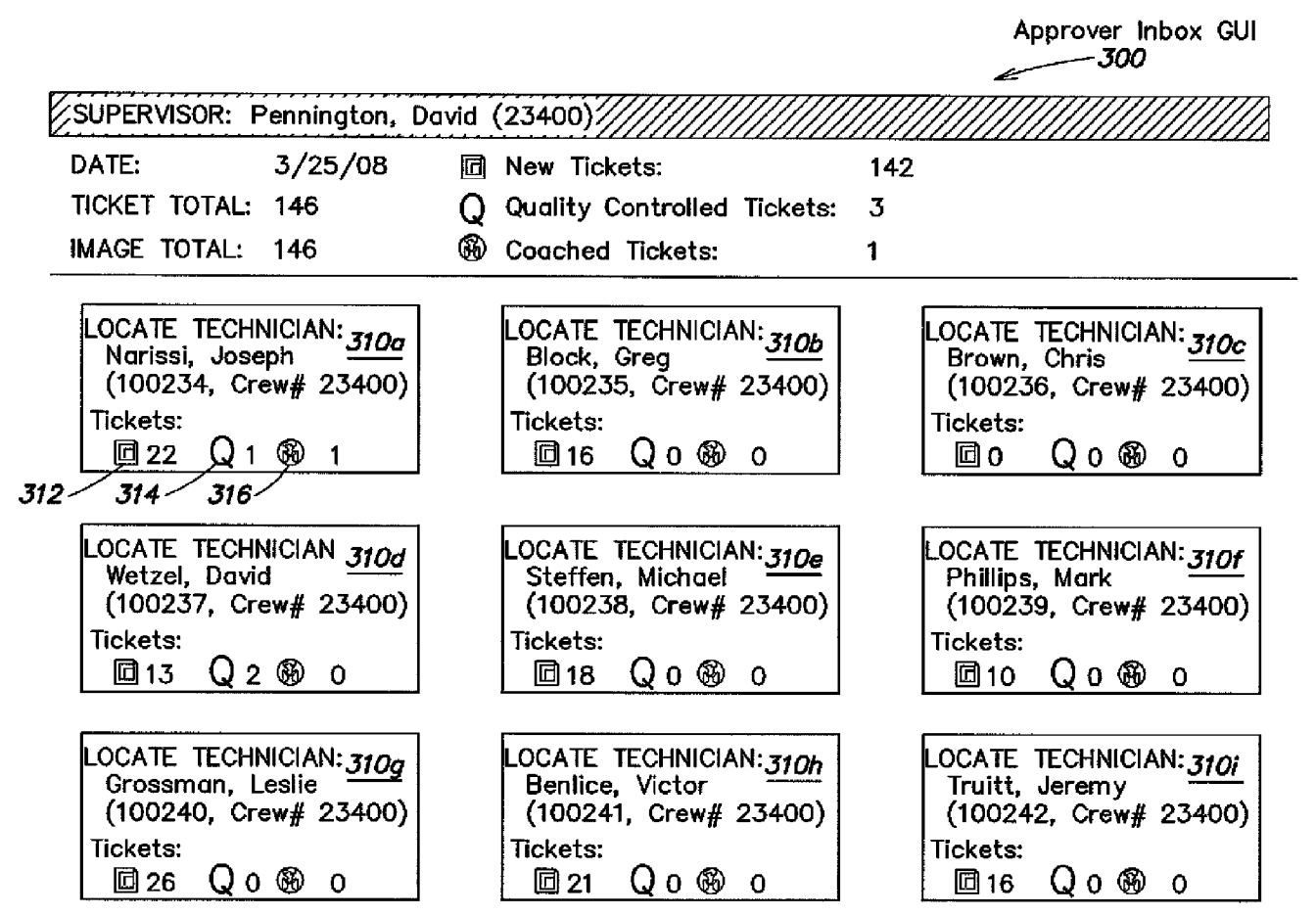

By way of example, FIG. 3 illustrates an example of an approver inbox GUI 300 for use in system 100 of the present disclosure. Approver inbox GUI 300 may be the user interface that is presented to approver 118 upon logging into ticket approval application 130. Approver inbox GUI 300 displays one or more locate technician windows 310 (310a-310i), whereby each of locate technician windows 310 is associated with certain locate technician 122 of the approver group. A display area of approver inbox GUI 300 may indicate the total number of new tickets, coaching referrals and QC referrals for the approver group. Approver 118 is able to select a new ticket via a new ticket icon 312 and is able to select tickets that have been referred for QC via a quality controlled ticket icon 314. Further, approver 118 is able to select tickets that have been referred for coaching via a coached ticket icon 316. In an example, approver 118 selects new ticket icon 312 of locate technician window 310a. Ticket approval application 130 reads in the associated ticket information and dig area/image data from tickets 134 and dig area/image data 136 of database 132.

At step 214, approver 118 reviews the dig area/image data of the selected ticket. For example, approver 118 reviews the ticket of locate technician window 310a that was selected at step 212.

Figure 4:
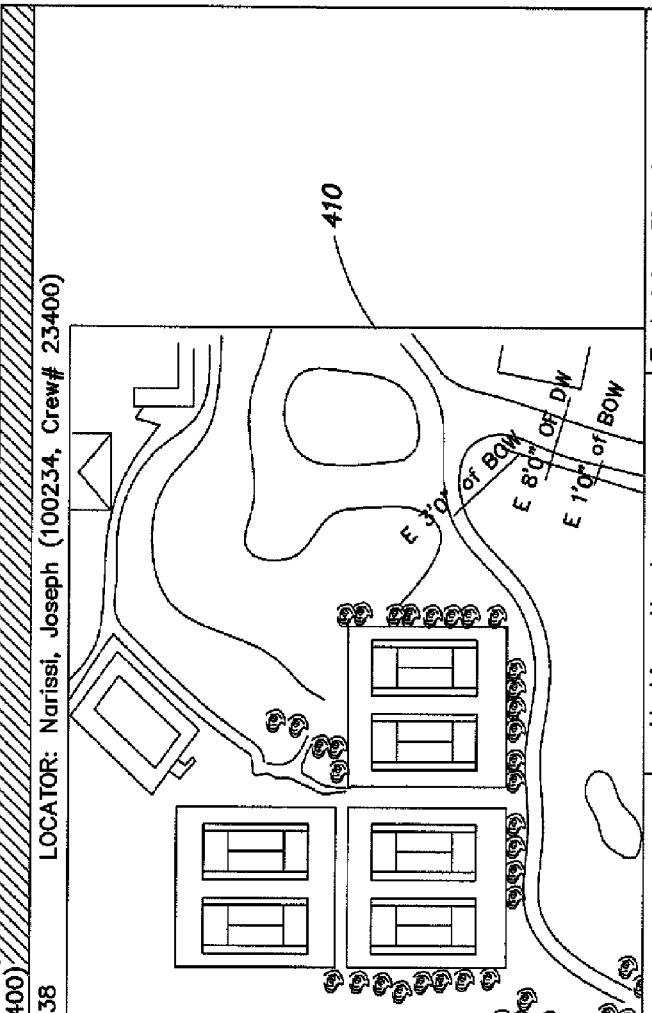
FIG. 4 illustrates an example of an approver image viewer GUI for use in the ticket approval system, in accordance with the present disclosure.

By way of example, FIG. 4 illustrates an approver image viewer GUI 400 for use in the ticket approval system of the present disclosure. Approver image viewer GUI 400 may include an image display area 410, multiple text display fields, such as a TICKET MANIFEST display field, and a WORK PERFORMED display field. Other information may be displayed, such as the ticket number, locate technician name, ticket details, locate marks used, and a locate technician signoff field. Additionally, approver 118 may select a navigate back icon 412 in order to return to a previous GUI, may select an approved icon 414 in order to categorize the ticket as satisfactory, may select a QC icon 416 in order to categorize the ticket as unsatisfactory and needing QC action, and may select a coach icon 418 in order to categorize the ticket as satisfactory, but locate technician is in need of coaching.

Approver 118 visually inspects the information that is displayed on approver image viewer GUI 400 and, in particular, compares the dig area image in image display area 410 with the information in the TICKET MANIFEST display field and a WORK PERFORMED display field.

If approver 118 determines that substantially all aspects of the locate operation are satisfactory, approver 118 selects approved icon 414 and method 200 proceeds to step 216. For example, if the information in the WORK PERFORMED display field and the markings that are shown at the dig area in image display area 410 satisfactorily match the information in the TICKET MANIFEST display field, approved icon 414 may be selected and method 200 proceeds to step 216. In this case, the risk of a locate error and damage to facilities during excavation is diminished.

If approver 118 determines that the locate operation itself is satisfactory, but certain aspects of the information that is provided by locate technician 122 needs improvement, approver 118 selects coach icon 418, which generates a coaching referral and method 200 proceeds to step 218. For example, the locate operation is satisfactory when the information in the WORK PERFORMED display field and the markings that are shown at the dig area in image display area 410 sufficiently match the information in the TICKET MANIFEST display field. In this case, risk of a locate error and damage to underground facilities during excavation may be low. However, certain details of the markings may need to improve. For example, a less than desirable anchor point has been marked. This may result in a minor inaccuracy, while not presenting a risk of damage during excavation. In this example, locate technician 122 may need training with regard to selecting anchor points.

If approver 118 determines that important aspects of the locate operation are unsatisfactory, approver 118 selects QC icon 416, which generates a QC referral and method 200 proceeds to step 224. In an example, a gross error that may prompt the need for QC action may be when the TICKET MANIFEST calls for gas, power, and water lines to be located and marked, yet the information in the WORK PERFORMED display field and site image in image display area 410 shows that only the gas and power lines were marked. In this example, because the water lines were not marked, there may be an increased risk of damage to the water lines during excavation, and immediate corrective action may be required.

Figure 5:
FIG. 5 illustrates an example of a QC referral popup window for use in the ticket approval system, in accordance with the present disclosure.

Further to the QC referral example, FIG. 5 illustrates an example of a QC referral popup window 500 for use in the ticket approval system of the present disclosure. QC referral popup window 500 shows a selection of various reasons for which a QC referral may be generated as well as a text box for entering notes. For the above example, QC referral popup window 500 shows that the reason for referral is "Member underground facility not seen as noted on manifest" and clarifying notes are shown. QC referral popup window 500 includes a submit QC referral icon 510 and a cancel QC referral icon 512. QC referral popup window 500 is not limited to the selections shown in FIG. 5 and may be designed to include any content.

Upon step 216, the ticket approval process is completed. The dig area/image data that is associated with approved tickets may be stored with the appropriate ticket(s) as a part of an archival process. The numerical count of approved tickets for the entire system, for each approver group of locate technicians 122 and for individual locate technician 122, may be updated and stored.

At step 218, the coaching referral is routed to the approver's inbox. For example, the coaching referral that is generated at step 214 may be maintained in the inbox of originating approver 118 for a certain period of time, such as, for example, ten business days. This allows for coaching schedules to be developed and completed in a timely manner.

At step 220, approver 118 performs the coaching activity with locate technician 122. For example, approver 118 steps through one or more coaching referrals in approver's 118 inbox for targeted locate technician 122 and performs one or more coaching activities, according to the contents of each coaching referral.

At step 222, locate technician 122 and approver 118 sign off on the coaching activities as acknowledgement that the coaching activity has been completed. A positive report of completing the coaching activities may be logged, for example, in the personnel file of locate technician 122. The one or more coaching referrals may then be removed from the inbox of approver 118.

At step 224, the ticket that is the subject of QC referral of step 214 is routed to a certain QC approver 116 for review. For example, certain QC approver 116 opens ticket approval application 130, views QC approver's inbox and selects a certain locate technician and ticket for which a QC review has been requested.

Figure 6:
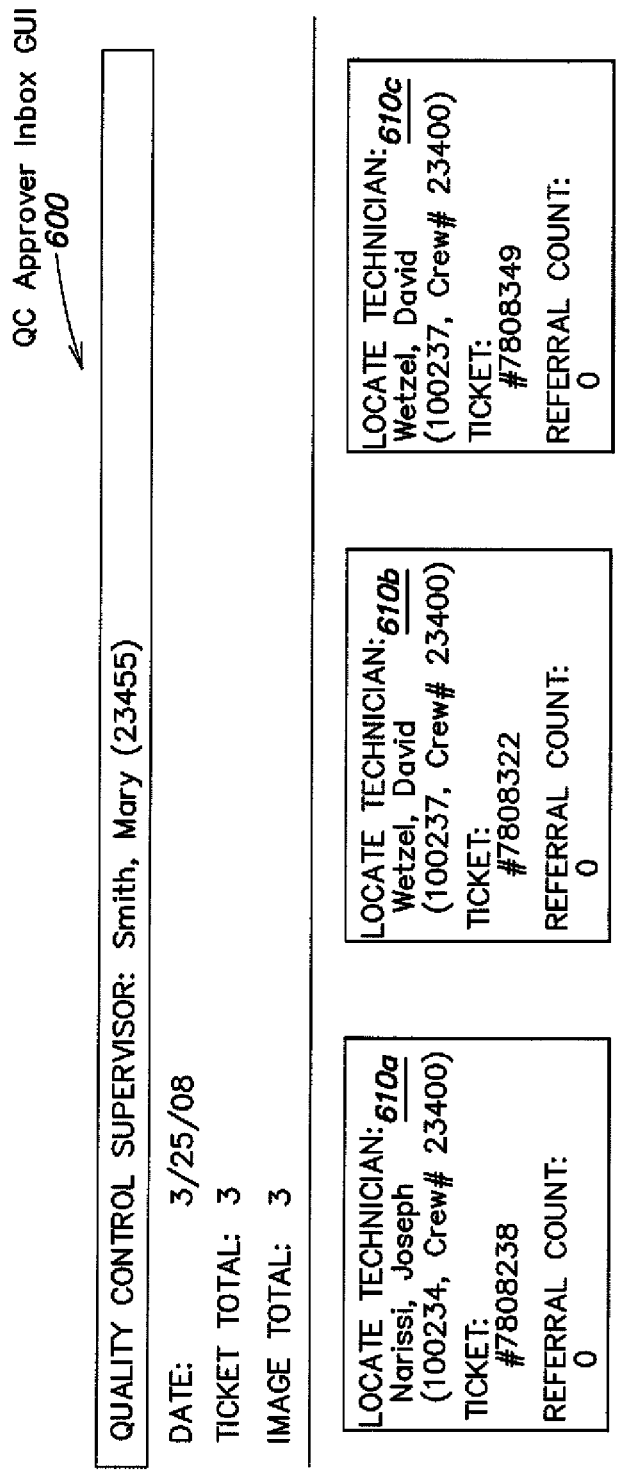
FIG. 6 illustrates an example of a QC approver inbox GUI for use in the ticket approval system, in accordance with the present disclosure.

By way of example, FIG. 6 illustrates an example of a QC approver inbox GUI 600 for use in the ticket approval system of the present disclosure. QC approver inbox GUI 600 may be the user interface that is presented to certain QC approver 116 upon logging into ticket approval application 130. QC approver inbox GUI 600 (610a-610c) displays one or more locate technician windows 610, whereby each locate technician window 610 is associated with certain locate technician 122 and QC referral. A display area of QC approver inbox GUI 600 shows the total number of QC referrals. QC approver 116 is able to select any locate technician window 610, for example, QC approver 116 selects locate technician window 610a. Ticket approval application 130 reads in the associated ticket information and dig area/image data from tickets 134 and dig area/image data 136 of database 132.

Figure 7:
FIG. 7 illustrates an example of a QC approver image viewer GUI for use in the ticket approval system, in accordance with the present disclosure.

At decision step 226, QC approver 116 determines whether to accept or reject the QC referral. For example, QC approver 116 reviews the dig area/image data of the selected QC referral. By way of example, FIG. 7 illustrates a QC approver image viewer GUI 700 for use in the ticket approval system of the present disclosure.

QC approver image viewer GUI 700 may include image display area 410, the TICKET MANIFEST display field, the WORK PERFORMED display field, and other information, as described in approver image viewer GUI 400 of FIG. 4. Additionally, QC approver image viewer GUI 700 includes a navigate back icon 412, an approved icon 414, a QC icon 416 and a coach icon 418, as described in approver image viewer GUI 400 of FIG. 4. QC approver image viewer GUI 700 may also include a text field for displaying notes that were entered by originating approver 118 and additional selections and/or text fields for routing the QC request to original locate technician 122 or to certain QC technician 120.

QC approver 116 visually inspects the information that is displayed on QC approver image viewer GUI 700 and compares the dig area image in image display area 410 with the information in the TICKET MANIFEST display field and a WORK PERFORMED display field. QC approver 116 determines whether QC approver 116 is in agreement with originating approver 118 that the ticket requires QC action.

If QC approver 116 determines that QC action is needed, method 200 proceeds to step 228. If QC approver 116 determines that no QC action is needed, method 200 proceeds to step 234. FIG. 8 illustrates an example of a reject QC popup window 800 for use in system 100. Reject QC popup window 800 may include a text field for entering the reason for rejection as well as a submit QC rejection icon 810 and a cancel QC rejection icon 812.

Optionally, QC approver 116 may determine that no QC action is needed, but coaching is recommended. In this case, method 200 proceeds to step 218. FIG. 9 illustrates an example of a coaching popup window 900 for use in system 100. Coaching popup window 900 may include a text field for entering the reason for coaching as well as a submit coaching request icon 910 and a cancel coaching request icon 912.

At step 228, QC approver 116 routes the ticket to a QC technician for execution. For example, QC approver 116 makes note of the QC action that is needed via QC approver image viewer GUI 700. In the example of step 214, wherein the water lines should have been marked, but were not, QC approver 116 makes a note that the water lines were not marked. QC approver 116 then routes the QC request to original (or alternate) locate technician 122 or to certain QC technician 120 who returns to the dig area to perform the required tasks (e.g., to mark the water lines).

At step 230, QC technician 120 completes the ticket and provides updated dig area/image data. For example, revis- iting the dig area in order to perform the tasks that are necessary to satisfy the QC referral. Upon completion of the QC operation, the dig area/image data of the image capture mechanism 124 is transmitted to image server 126 or directly to work management server 112. In doing so, the updated dig area/image data is accessible to ticket approval application 130.

Figure 10:
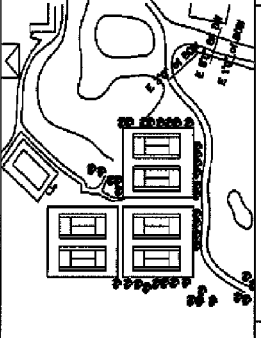
FIG. 10 illustrates another example of the approver image viewer GUI for use in the ticket approval system, in accordance with the present disclosure.

At step 232, approver 118 that originated the QC referral opens approver inbox GUI 300 and reviews the updated ticket via approver image viewer GUI 400. FIG. 10 illustrates another example of approver image viewer GUI 400 that includes additional information. For example, approver 118 is able to view additional notes that have been added along the entire history of the ticket by, for example, QC approver 116 who processed the QC referral and/or QC technician 120 who was assigned to perform the QC operation. Additionally, approver 118 is able to view the original dig area images supplied by original locate technician 122 as well as the new dig area images supplied by QC technician 120. Method 200 returns to step 212 where approver 118 may again review the updated ticket similar to any other ticket.

At step 234, certain QC approver 116 routes the ticket back to the originating approver 118. Method 200 returns to step 212 where approver 118 may again review the ticket similar to any other ticket.

Figure 11:
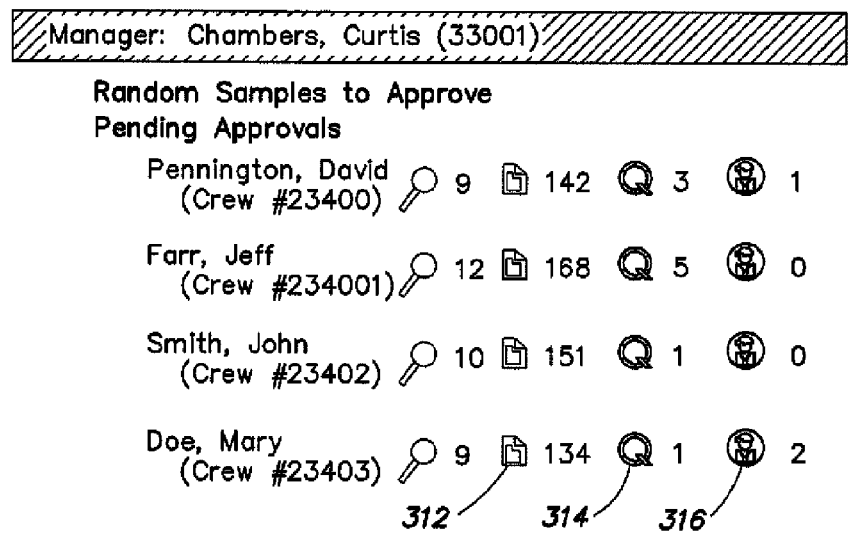
FIG. 11 illustrates an example of a ticket summary GUI for use in the ticket approval system, in accordance with the present disclosure.

Method 200 is not limited to the operations that are described in FIG. 2. Other operations may occur, such as tracking the status of QC referrals, flagging delinquent QC referrals, tracking the status of coaching referrals, flagging delinquent coaching referrals, tracking the total ticket numbers across the entire service provider, and dashboard reporting. For example, FIG. 11 illustrates an example of a ticket summary GUI 1100 for use in the ticket approval system of the present disclosure. At any time, manager 114 may view the current numerical count of approved tickets, coaching referrals and QC referrals. For example, the ticket summary GUI 1100 shows a summary of these counts, organized by approver groups.

In an alternative embodiment, an example of a real time (or substantially real time) method of performing oversight and quality control in locate operations using the ticket approval system of the present disclosure may be enabled by use of, for example, email infrastructure. In this embodiment, work management server 112 and, in particular, ticket approval application 130 may be accessible via an email application and there may be email communication between entities. Upon completion of a ticket, locate technician 122 may send an email to approver 118 that includes substantially the same content as shown in approver image viewer GUI 400. By use of an email application, approver 118 may process the ticket much the way that has been described in FIGS. 1 through 11, wherein the various GUIs are viewed and processed via the email application. In this embodiment, the workflow is being pushed from locate technicians 122 to approvers 118, rather than being pulled by approvers 118 from locate technicians 122. It is further contemplated that approver 118 will provide a signature, such as, an electronic signature or other indicator to signify completion of the review process.

Similarly, the use of additional communication devices such as mobile telephones, PDAs, portable computers (i.e., laptops and tablet PCs), text messaging and the like are contemplated within all aspects of the present disclosure. By use of one or more of the additional communication devices, any manager/approver/QC technician/locate technician (114, 116, 118 and 120) may process the tickets much the way that has been described in FIGS. 1 through 11, wherein the various GUIs are viewed and processed via any of the one or more additional communication instruments.

Further, it is contemplated that dig area and image data, tickets and related communications according to the present disclosure can be made through wireless interfaces including, for example, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), combinations thereof, and other types of wireless networking protocols. Additionally, the wireless interface may be capable of capturing signals that reflect a user's intent. For example, the wireless interface may include a microphone that can capture a user's intent by capturing the user's audible statements or commands. Alternatively, the wireless interface may interact with a device that monitors a condition or biological state of the user, such as eye movement, brain activity, heart rate, and/or other subtle signals.

While the ticket approval system and methods of FIGS. 1 through 11 have been described in the context of underground facility locate applications, this is only for exemplary purposes. The ticket approval system and method of the present disclosure may be applicable to any field service or distributed workforce application.

Furthermore, while the ticket approval system and methods of FIGS. 1 through 11 have been described in the context of oversight and quality control of locate operations, the system and methods of the present disclosure are not limited to locate operations involving underground facilities only. The system and methods of the present disclosure are suitable for performing quality control of locate operations, activities to detect or infer the presence or absence of above ground facilities, and any combination thereof. Additionally, the system and methods of the present disclosure can be used in other industries and practices such as, for example, used in the inspection practices of the building and construction fields.

No element, act, or instruction used in the present application should be construed as critical or essential to the present disclosure unless explicitly described as such. In addition, as used herein, the article "a" is intended to include one or more items. Where only one item is intended, the term "one" or similar language is used.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

What is claimed is:

1. A method of performing quality control for a locate and marking operation performed by a locate technician at a dig area of proposed excavation, the method comprising steps of:
   electronically receiving a locate request ticket at a work management server, the locate request ticket including ticket information regarding at least one task to be performed by the locate technician during the locate and marking operation;
   dispensing a marking material and/or a marking object in the dig area, via a GPS-enabled marking device used by the locate technician at the dig area, to form physical locate marks representing a presence or an absence of at least one underground facility in the dig area, wherein the GPS-enabled marking device generates a data set of GPS coordinates corresponding to approximate geographic locations of the physical locate marks;
   generating marking data, via a GPS-enabled image capture mechanism used by the locate technician at the dig area, wherein the GPS-enabled image capture mechanism is communicatively coupled to the GPS-enabled marking device, and wherein the marking data includes:
      an image of the dig area showing overlaid representations of the physical locate marks formed by dispensing the marking material and/or the marking object via the marking device, wherein the overlaid representations are based on the data set of GPS coordinates generated by the GPS-enabled marking device; and
      GPS data representing a geographic location of the GPS-enabled image capture mechanism;
   electronically transmitting the marking data from the GPS-enabled image capture mechanism to the work management server;
   electronically receiving the marking data at the work management server, wherein the work management server includes a database and an approval application, and wherein the approval application provides a graphical computerized mechanism, via at least one display device communicatively coupled to the work management server, to facilitate the quality control of the locate and marking operation; and
   electronically displaying, via the at least one display device:
      i) the ticket information from the locate request ticket regarding the at least one task to be performed by the locate technician, wherein the ticket information includes at least one utility member code corresponding to a utility expected to be present in the dig area of proposed excavation; and
      ii) the marking data including the image of the dig area showing the overlaid representations of the physical locate marks and the GPS data from the at least one GPS-enabled image capture mechanism,
   wherein an approver compares at least the displayed ticket information including the at least one utility member code corresponding to a utility expected to be present in the dig area of proposed excavation and the displayed marking data and thereby remotely performs oversight and the quality control of the locate and marking operation.

2. The method of claim 1, wherein a portion of the task includes locating the presence or the absence of the at least one underground facility.

3. The method of claim 1, wherein at least a portion of the electronically received marking data includes data streaming or continuous data streaming.

4. The method of claim 1, further comprising:
   performing a review by the approver of the marking data associated with the at least one task at a location associated with the ticket and included in the ticket information.

5. The method of claim 1, wherein the database stores relationships among the marking data, the locate request ticket, the locate technician, the approver, and a time stamp when approved by the approver.

6. The method of claim 1, wherein the approval application provides a mechanism whereby the approver may compare the marking data and the ticket information in real time or substantially real time.

7. The method of claim 1, wherein comparing the ticket information and the marking data results in either an approved ticket, a coaching referral ticket, or a quality control referral ticket.

8. The method of claim 7, wherein the quality control referral ticket is dispatched to the locate technician to perform another task associated with the locate request ticket.

9. The method of claim 7, wherein the quality control referral ticket is dispatched to a supervisor or a quality assurance personnel.

10. The method of claim 7, wherein the quality control referral ticket requires a follow up task, and wherein the method further comprises:
flagging the follow up task for review by the approver if the follow up task has not been completed in a predetermined time period.

11. The method of claim 1, wherein the marking data includes an image.

12. The method of claim 1, wherein the approver provides feedback in real time or substantially real time to the locate technician performing the at least one task associated with the locate request ticket.

13. A method of performing quality control for a locate and marking operation performed by a locate technician at a dig area of proposed excavation, the method comprising steps of:
dispensing a marking material and/or marking object, via a GPS-enabled marking device used by the locate technician at the dig area, to form physical locate marks representing a presence or an absence of at least one underground facility in the dig area, wherein the GPS-enabled marking device generates a data set of GPS coordinates corresponding to approximate geographic locations of the physical locate marks;
generating marking data associated with the marking of the presence or the absence of the at least one underground facility, via a GPS-enabled image capture mechanism used by the locate technician at the dig area, wherein the GPS-enabled image capture mechanism is communicatively coupled to the GPS-enabled marking device, and wherein the marking data includes:
an image of the dig area showing overlaid representations of the physical locate marks formed by dispensing the marking material and/or the marking object via the marking device, wherein the overlaid representations are based on the data set of GPS coordinates generated by the GPS-enabled marking device; and
GPS data representing a geographic location of the GPS-enabled image capture mechanism;
electronically transmitting at least the marking data from the GPS-enabled image capture mechanism to the work management server, wherein the work management server includes a database and an approval application, wherein the approval application is a software application that provides a graphical computerized mechanism, via at least one display device communicatively coupled to the work management server, to facilitate the quality control of the locate and marking operation; and
electronically displaying, via the at least one display device:

i) at least one utility member code corresponding to a utility expected to be present in the dig area of proposed excavation; and
ii) the marking data representing performance by the locate technician of the marking of the presence or the absence of the at least one underground facility,
wherein an approver compares at least the at least one utility member code and the displayed marking data and thereby remotely performs oversight and the quality control of the locate and marking operation.

14. The method of claim 13, wherein the database stores relationships among the marking data, the locate technician, and the approver.

15. The method of claim 13, wherein the approval application provides a mechanism whereby the approver compares the marking data and the at least one utility member code in real time or substantially real time.

16. The method of claim 13, further comprising the step of:
the locate technician performing a self review of the data.

17. The method of claim 16, wherein the self review is performed near or at the dig area.

18. The method of claim 13, wherein the step of comparing the marking data and the at least one utility member code results in either an approved ticket tag, a coaching referral ticket tag, or a quality control referral ticket tag.

19. The method of claim 18, wherein an updated locate request ticket tagged with the quality control referral tag is dispatched to the locate technician to perform another task.

20. The method of claim 18, wherein an updated locate request ticket tagged with the quality control referral tag requires a follow up task, and wherein the follow up task not completed in a predetermined time period is flagged for review by an approver.

21. The method of claim 18, wherein an updated locate request ticket tagged with the quality control referral tag is dispatched to a supervisor or a quality assurance personnel.

22. The method of claim 13, wherein the approver that performs the step of comparing provides feedback in real time or substantially real time to the locate technician.

23. A system for maintaining quality control for a locate and marking operation performed by a locate technician at a dig area of proposed excavation, the system comprising:
a GPS-enabled marking device used by the locate technician at the dig area to dispense a marking material and/or a marking object in the dig area so as to form physical locate marks representing a presence or an absence of at least one underground facility in the dig area, wherein the GPS-enabled marking device generates a data set of GPS coordinates corresponding to approximate geographic locations of the physical locate marks;
a memory to store a locate request ticket identifying a dig area within which excavation is planned, the locate request ticket including ticket information and regarding an operation to be performed by the locate technician regarding physically marking the presence or absence of at least one underground facility in the dig area;
a communication interface;
at least one display device;
a GPS-enabled image capture mechanism, coupled to the communication interface and to the GPS-enabled marking device, to generate marking data associated with the locate request ticket and to provide the marking data to the communication interface, the marking data relating to the marking by the locate technician of the presence or the absence of the at least one underground facility in the dig area as part of performance of the operation, wherein the marking data includes:
- an image of the dig area showing overlaid representations of the physical locate marks formed by dispensing the marking material and/or the marking object via the marking device, wherein the overlaid representations are based on the data set of GPS coordinates generated by the GPS-enabled marking device; and
- GPS data representing a geographic location of the GPS-enabled image capture mechanism; and a work management server, coupled to the communication interface and the at least one display device and including a database and a locate request ticket approval application, the locate request ticket approval application providing a graphical computerized mechanism, via the at least one display device, for an approver to perform a quality control review of the locate request ticket based on a comparison of at least the marking data from the performance of the operation obtained by the image capture mechanism and the locate request ticket information regarding the operation to be performed, wherein the locate request ticket information includes at least one utility member code corresponding to a utility expected to be present in the dig area within which excavation is planned.

24. The system of claim 23, further comprising a user input device, wherein the approver provides feedback to the locate request ticket approval application, via the user input device, based on whether or not the locate request ticket has been completed or completed properly.

25. The system of claim 23, wherein the approver tags the locate request ticket and the data to indicate that further work should be performed pursuant to the locate request ticket.

26. The system of claim 23, wherein the approver tags the locate request ticket and the data to indicate that further work should be performed pursuant to the associated geographic area.

27. A system for performing quality control of a locate and marking operation performed by a locate technician at a dig area of proposed excavation, comprising:
- a GPS-enabled marking device used by the locate technician at the dig area to dispense a marking material and/or a marking object in the dig area so as to form physical locate marks representing a presence or an absence of at least one underground facility in the dig area, wherein the GPS-enabled marking device generates a data set of GPS coordinates corresponding to approximate geographic locations of the physical locate marks;
- a memory to store a locate request ticket, wherein the locate request ticket includes ticket information including at least one utility member code corresponding to a utility expected to be present at the dig area of proposed excavation;
- a GPS-enabled image capture mechanism, coupled to the GPS-enabled marking device, to generate marking data including:
  - an image of the dig area showing overlaid representations of the physical locate marks formed by dispensing the marking material and/or the marking object via the marking device, wherein the overlaid representations are based on the data set of GPS coordinates generated by the GPS-enabled marking device; and
  - GPS data representing a geographic location of the GPS-enabled image capture mechanism;
- a work management server coupled to the communication interface and including a database and a locate request ticket approval application, wherein the locate request ticket approval application is a software application that provides a graphical computerized mechanism allowing an approver to review the marking data;
- at least one display device coupled to the work management server to display the image; and
- a user input device coupled to the work management server to provide at least one indication to the ticket approval application of a quality assessment of the locate and marking operation based at least in part on the ticket information and the, wherein the ticket information includes the at least one utility member code.

* * * * *